Nov. 15, 1932.  U. U. CARR  1,887,542
PIPE LINE STOPPER
Filed Dec. 12, 1930  2 Sheets-Sheet 1
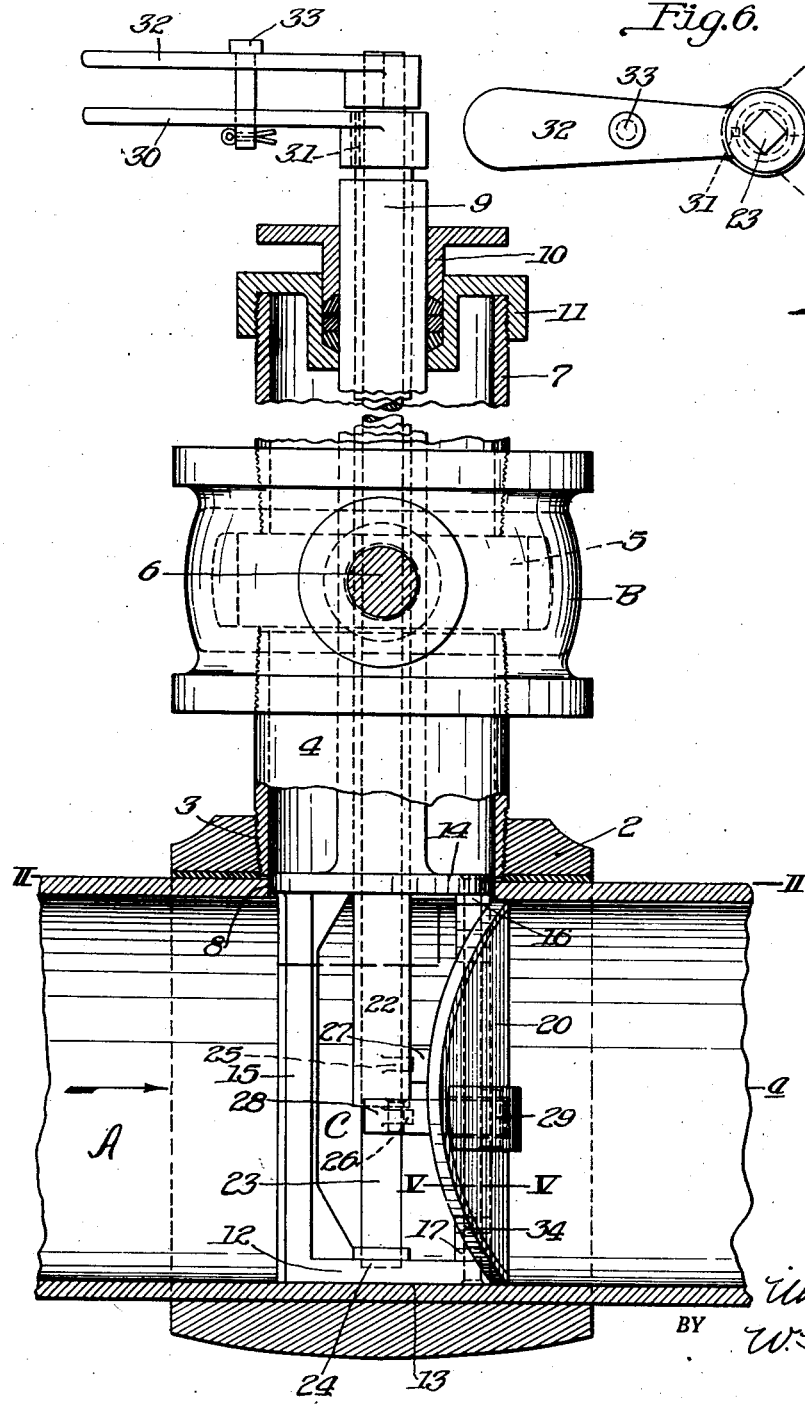

Nov. 15, 1932.  U. U. CARR  1,887,542
PIPE LINE STOPPER
Filed Dec. 12, 1930  2 Sheets-Sheet 2
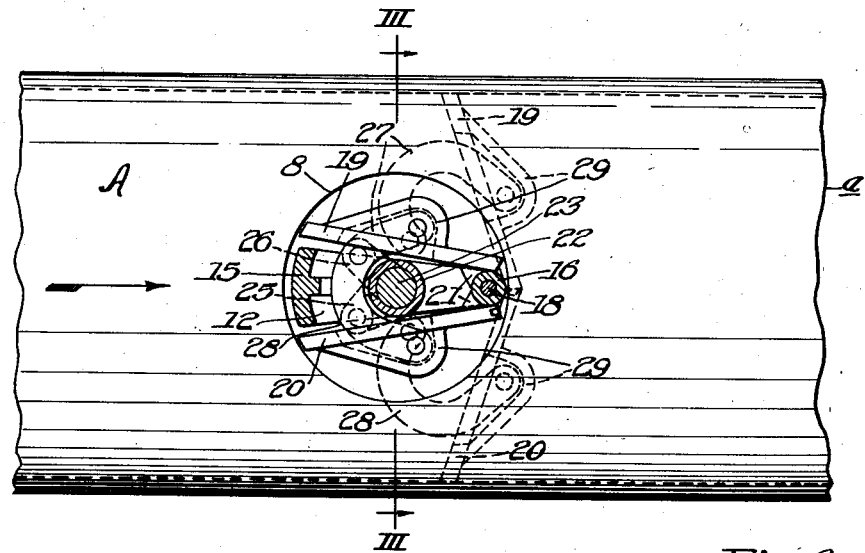
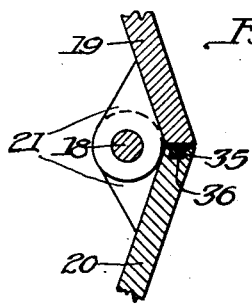
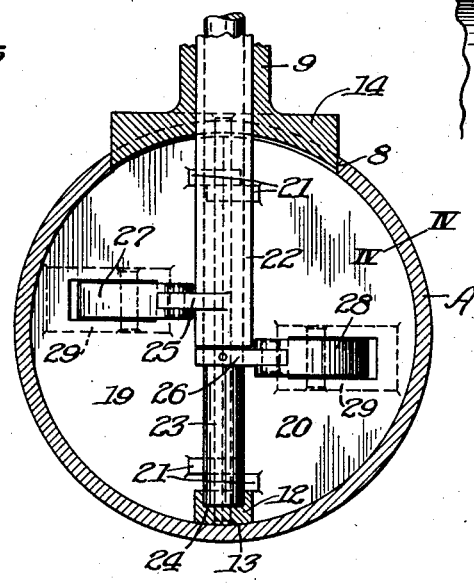
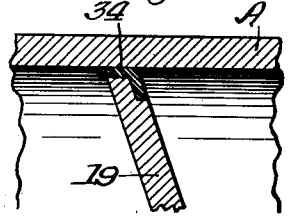
INVENTOR.
Uhel U. Carr
BY W. G. Doolittle
ATTORNEY Patented Nov. 15, 1932

1,887,542

UNITED STATES PATENT OFFICE

UHEL U. CARR, OF MONONGAHELA, PENNSYLVANIA, ASSIGNOR OF ONE-HALF TO MAJOR R. McKINLEY, OF MONONGAHELA, PENNSYLVANIA

PIPE LINE STOPPER

Application filed December 12, 1930. Serial No. 501,851.

This invention relates to a new and improved closure device, particularly designed for use in closing off or stopping the flow of fluid, as gas and/or oil, through a pipe line or main. It is especially designed for use when a break occurs in a large capacity pipe-line carrying gas under considerable pressure, and the construction is of such character that it may be employed with well known forms of saddle and yoke constructions now generally employed for connecting branch lines to the main.

My invention has for its main object to provide a simple and efficient closure device or stopper for high pressure lines that may be readily applied and easily manipulated, whereby the flow through the main may be temporarily stopped.

Further objects are to provide a construction embodying pivotally mounted, preferably semi-circular metal diaphragm members capable of resisting high pressure; compact and efficient means for moving said members into closed and open position within the main, operable from outside the main, and having means associated therewith to prevent the escape of gas or other fluid while positioning the closure device on and/or removing it from the main; and a simple and efficient construction that may be employed in connection with branch pipe connecting means.

In the accompanying drawings, which illustrate an application of my invention:

Fig. 1 is a part elevational view and a part vertical sectional view of a closure device embodying my invention applied to a main, with the closure means thereof in expanded position;

Fig. 2, a sectional view taken on the line II—II of Fig. 1, particularly showing the closure means in retracted position;

Fig. 3, a cross-section on the line III—III of Fig. 2, with the closure means in the expanded position of the dotted lines of Fig. 2;

Figs. 4 and 5, enlarged fragmentary sections taken on the lines IV—IV of Fig. 3 and V—V of Fig. 1, respectively; and Fig. 6, a plan view of the operating levers of Fig. 1, illustrating the locking means therefor.

Referring to the drawings, A designates a section of a pipe or conduit for conveying fluids, as for example, a pipe line for gases, which has become fractured at $a$. To enable repair of the same and/or maintain an uninterrupted supply of gas by means of said pipe, the broken end $a$ must be shut off in some suitable manner, and it is to this object that my invention is particularly directed.

In practicing my invention, a pipe saddle 2 is first secured to the pipe line A, adjacent to and on the pressure side of the break $a$, said saddle having a threaded opening 3 therein for receiving a threaded end of a tubing section 4 extending at right angles to said pipe line. The other end of the tubing 4 is screw-threaded into one side of a horizontally disposed gate valve B, having a gate 5 therein adapted to be translated by means of an operating stem 6.

A second tubing section 7 is screw-threaded into the other side of said gate valve B. A drill (not shown) is lowered through the tubing 7, valve B, and tubing 4, onto the pipe line A. A suitable stuffing box is affixed to the outer end of the tubing 7 and around the drill shank to protect the operator from escaping gas. The drill is rotated by external means and a circular opening 8 is cut through the wall of the pipe line A, whereupon said drill is retracted and the gate 5 of valve B closed to prevent the escape of gas. The drilling stuffing box is then removed from the tubing 7, together with the drill.

The closure device embodying my invention, generally designated C, is lowered through the tubing 7 onto the gate 5 of the valve B. The hollow stem 9 thereof extends beyond the said tubing and is passed through a stuffing-box 10, said stuffing-box engaging the tubing by means of a threaded flange 11. The gate valve B is then opened and the closure device C lowered into the pipe line A through the opening 8 therein. During this operation, the parts of the closure device are in the compact retracted position shown in the full lines of Fig. 2 so as to pass through said opening.

Depending from the stem 9 of the closure device, I provide an open cage or framework including a base member 12 having the bottom surface 13 thereof preferably curved to fit the inner curvature of the wall of the pipe line A, and a circular top member 14 spaced from said base member and adapted to fit snugly in the opening 8. Said top and base members are joined by means of an integral connecting member 15.

Diametrically opposite the connecting member 15, the cage is provided with alined apertured bosses 16 and 17 extending toward each other from the top and base members respectively, and adapted to receive a hinge pin 18 having its ends riveted to the said top and base members, as shown. The closure means proper of my invention are pivoted to said hinge pin and include a pair of semicircular diaphragm members 19 and 20. Said diaphragm members are preferably alike and have apertured hinge lugs 21 formed thereon, through which the hinge pin 18 is passed. The members 19 and 20 are of sufficient size to close off the bore of the pipe line A when in the expanded position of Figs. 1 and 3, but when retracted as in Fig. 2, they may be passed through the opening 8 in said pipe line.

For the purpose of expanding and/or retracting the diaphragm members, I employ concentrically arranged members including, as shown, a hollow sleeve 22 rotatable within the hollow stem 9, and a shaft or spindle 23 rotatable within the sleeve 22, said spindle having an end positioned in a socket 24 in the base member 12. The sleeve and spindle are provided with radially extending arms 25 and 26 respectively, said arms being disposed one above the other in spaced relation. Curved bifurcated links 27 and 28 respectively connect the arm 25 and the diaphragm member 19, and the arm 26 and the diaphragm member 20, by means of suitable pivot pins, as particularly shown in Figs. 2 and 3. The ends of said links 27 and 28 for connection with the diaphragm members are preferably received in recessed sockets 29 in said members.

The sleeve 22 extends outwardly beyond the hollow stem 9 to receive an operative lever 30, secured thereto as by means of a key connection 31. Similarly, the spindle 23 extends outwardly beyond the sleeve 22, and an operating lever 32 is secured to the squared end of said spindle. Said levers 30 and 32 are preferably spaced in the angular relation shown by the dotted lines of Fig. 6, when the diaphragm members are in the retracted position of Fig. 2.

With the device positioned in the pipe line A, as hereinbefore described the levers 30 and 32 are rotated toward one another, as indicated by the arrows of Fig. 6, whereby the sleeve 22 and the spindle 23 are rotated in opposite directions to expand the diaphragm members 19 and 20 outwardly about the hinge pin 18, by means of the arms 25, 26, and the links 27, 28. The said diaphragm members are moved into contact with the walls of the pipe line A, and when the levers 30 and 32 are in superimposed relation of Figs. 1 and 6, the outer circular edges of the members will effect a perfect seal with said pipe.

When the diaphragm members are in expanded position, a locking pin 33 may be passed through suitable registering openings in the levers 30 and 32, thereby locking and maintaining said members in expanded relation.

Suitable gaskets or packing elements may be provided, as shown in Figs. 4 and 5. A packing strip 34 may be secured to the curved edges of the diaphragm members 19 and 20, and is adapted to be forced against the walls of the pipe line A to more effectively seal the same. Also, said packing 34 will compensate for any irregularities in the inner surface of the pipe. The inner meeting edges of the diaphragm members 19 and 20 adjacent the hinge pin 18 may be more effectively sealed by means of a rubber or other gasket 35 positioned in a groove 36 in one of said edges, and adapted to be contacted by the other edge, as shown in Fig. 5.

Thus, it will be readily seen that an effective seal is produced whereby the gas or other fluid flowing through the pipe line A may be shut off during the repair of the line, and without the escape of gas through the closure device, thereby eliminating the danger to the operator.

It is to be noted that the diaphragm members 19 and 20 are inclined toward the direction of flow of fluid, as indicated by the arrows, whereby the pressure of said fluid tends to force the said members into a tighter sealing contact with the walls of the pipe line A.

I claim:

1. A device of the character described including a body for insertion through an opening formed in a pipe, an elongated hollow stem, a pair of pivotally mounted diaphragm members carried by the body, means for moving said members into open and closed positions including a pair of rotatable members disposed and operable in the stem, and means for pivotally connecting each diaphragm member with a rotatable member.

2. A device of the character described including a body for insertion through an opening formed in a pipe, a pair of pivotally connected diaphragm members carried by the body, means for moving said members into open position to effect a seal between the interior of the pipe and said members and into closed positions, said last mentioned means comprising concentrically arranged rotatable members operable within the pipe, one having operative engagement with one diaphragm member and the other operative engagement with the other diaphragm member.

3. A device of the character described including a body for insertion through an opening formed in a pipe, a pair of pivotally connected diaphragm members carried by the body, means for moving said members into open and closed positions, said means including a rotatable sleeve operable within the pipe, means connecting the sleeve and one diaphragm member, a rotatable member within the sleeve, and means connecting a diaphragm member to the last mentioned rotatable member.

4. A device of the character described including a body for insertion through an opening formed in a pipe, a pair of substantially semi-circular metal diaphragm members carried by the body, means for hingedly connecting said members on the body, means for manipulating said members to expand and contract them, and diametrically disposed means on the body for closing the pipe opening and for contact with the interior surface of the pipe.

5. A device of the character described including a body for insertion through an opening formed in a pipe, a pair of substantially semi-circular metal diaphragm members, means for hingedly connecting said members on the body, and means for manipulating said members to expand and contract them, said manipulating means comprising concentrically arranged vertically extending elongated rotatable members operable within the pipe, and means respectively connecting the diaphragm members to the respective rotatable members.

In testimony whereof I affix my signature.

UHEL U. CARR.